United States Patent [19]

Skinner, Sr.

[11] Patent Number: 5,664,002

[45] Date of Patent: *Sep. 2, 1997

[54] METHOD AND APPARATUS FOR PROVIDING POWER TO A COAXIAL CABLE NETWORK

[75] Inventor: Russell A. Skinner, Sr., Larkspur, Colo.

[73] Assignee: U S West, Inc., Englewood, Colo.

[*] Notice: The term of this patent shall not extend beyond the expiration date of Pat. No. 5,355,401.

[21] Appl. No.: 556,537

[22] Filed: Nov. 13, 1995

Related U.S. Application Data

[63] Continuation of Ser. No. 191,303, Feb. 3, 1994, Pat. No. 5,467,384, which is a continuation-in-part of Ser. No. 68,827, May 28, 1993, Pat. No. 5,355,401.

[51] Int. Cl.$^6$ .......................... H04M 9/00; H04M 11/04; H04M 1/00

[52] U.S. Cl. ................ 379/56.2; 359/171; 340/310.01; 455/3.3

[58] Field of Search ............... 379/56, 66, 413, 379/90, 110; 359/171, 174, 176, 177, 179, 173, 123, 124, 125, 118, 137; 348/6, 8, 10, 12, 14, 13; 455/3.3, 4.2; 340/310.01, 310.06

[56] References Cited

U.S. PATENT DOCUMENTS

| | | |
|---|---|---|
| 4,367,548 | 1/1983 | Cotten, Jr. |
| 4,441,180 | 4/1984 | Schussler |
| 4,491,983 | 1/1985 | Pinnow et al. |
| 4,686,667 | 8/1987 | Ohnsorge |
| 4,860,287 | 8/1989 | Kelly |
| 4,912,553 | 3/1990 | Pal et al. |
| 5,185,738 | 2/1993 | Kelly |
| 5,189,673 | 2/1993 | Burton et al. |
| 5,345,592 | 9/1994 | Woodmas |
| 5,355,401 | 10/1994 | Skinner, Sr. |
| 5,467,384 | 11/1995 | Skinner, Sr. |

FOREIGN PATENT DOCUMENTS

| | | |
|---|---|---|
| 0300686 | 12/1988 | Japan |
| 1126286 | 1/1967 | United Kingdom |
| 2237709 | 5/1991 | United Kingdom |
| 2263844 | 4/1993 | United Kingdom |
| 9210883 | 6/1992 | WIPO |

OTHER PUBLICATIONS

Homeworx Fiber in the Loop System from ADC Telecommunications, A Partner in the Expanding Network; Mar. 1992.
Rochester Tel taps ADC for Video Trials; Telephony; May 31, 1993, pp. 8–9.
Cable, Phone Firms Wrangle over future; USA Today; Feb. 11, 1993, pp. B1, B2.
First Pacific Networks' Wideband Personal Xchange; Telephone News; Aug. 28, 1989; vol. 10, No. 33.
European Conf. on Optical Communications; Genoa Italy; 1978 Miki et al.; Two way WDM Transmission.
Conceptual Design of a Switched Television–Distribution System using Optical–Fiber Waveguides; Hara; IEEE Transactions; 1977 pp. 120–130.
Voice Follows Video; CED; Communications Engr. & Design, Jun. 1993, p. 67.
ADC Launches Fiber Coax Platform; Telephony, May 24, 1993; pp. 11–12.
Bells' Brash CEO Bets Big on TV Dream; USA Today; Apr. 22, 1993; pp. B1,2.
U S West Picks Omaha to Test New Data Network; The Denver Post; Apr. 24, 1993; pp. C1,2.

(List continued on next page.)

*Primary Examiner*—Curtis Kuntz
*Assistant Examiner*—Michael B. Chernoff
*Attorney, Agent, or Firm*—Timothy R. Schulte; Stephen F. Jewett

[57] ABSTRACT

A fiber optic/coaxial cable telephony network including power. Power is supplied through the coaxial cable portion of the video network to a cable network unit where the power is converted and supplied to the equipment including customer premises equipment.

8 Claims, 4 Drawing Sheets

OTHER PUBLICATIONS

Homeworx Fiber in the Loop System; ADC Telecommunications; Jun. 1992.

"Fiber in the Loop Systems Powering: Bellcore Requirement" H.R. Salloum, Intelec '92, Oct. 4, 1992, Washington, D.C., pp. 117–123.

"A Flexible, Modular Power–Feeding System for Digital Optical Waveguide Transmission" G. Musil et al., Intelec '87, Jun. 14, 1987, Stockholm, pp. 601–606.

"Powering Issues Associated with the Deployment of Fiber into the Local Loop—A SWBT Perspective", J.D. Coleman, Broadband '90, Sep. 24, 1990, Baltimore, pp. 212–217.

"Fiber in the Local Loop Spawns Power Concerns", J. Davis, Telephony, Apr. 29, 1991, pp. 24–28.

"Intelligent Battery System for Fiber in the Loop", T. Miyazaki et al., Intelec '92, Oct. 4, 1992, Washington, D.C., pp. 112–116.

"Broad–Band Communication Systems in Great Britian", W.K. Ritchie, IEEE Journal on Selected Areas in Communication, vol. SAC–4, No. 4, Jul. 1986, New York, pp. 589–595.

METHOD AND APPARATUS FOR PROVIDING POWER TO A COAXIAL CABLE NETWORK

CROSS-REFERENCE TO RELATED APPLICATION

This application is a continuation of U.S. patent application Ser. No. 08/191,303, filed on Feb. 3, 1994, now U.S. Pat. No. 5,467,384 which is a continuation-in-part of U.S. patent application Ser. No. 08/068,827, filed on May 28, 1993, which issued as U.S. Pat. No. 5,355,401 on Oct. 11, 1994.

TECHNICAL FIELD

The invention relates to the field of telecommunications. More particularly, the invention relates to the field of distribution systems. In still greater particularly, the invention relates to the provision of video and telephony services combined with a power distribution network. By way of further characterization, but not by way of limitation thereof, the invention uses a power supply connected to a coaxial cable network to provide power for a telephony network.

BACKGROUND ART

Information, and access to it, has received significant attention recently. The building of an "information highway" compared to the national interstate highway system begun in the 1950s has been made a national priority. There are currently three wireline transport elements available for such a highway: (1) fiber optic cable; (2) coaxial cable; and (3) twisted copper pair cable ("twisted pair"). Presently, twisted pair cable predominates, certainly in the local loop portion of telephone networks. Coaxial cable has been used widely by cable television companies and both telephone companies and cable companies have made use of fiber optics for main or trunk line signal transport.

Fiber optic cable can carry more information over a greater distance than coaxial cable, while coaxial cable can carry more information over a greater distance than twisted pairs. Because twisted pair is the predominant local loop technology at least in the telephone industry, attempts have been made to develop technologies which will increase the carrying capacity of copper. In reality, copper wire is a very efficient transport means for traditional telephony services.

Because of their high bit rate transport capability, fiber optic-based systems are preferably to copper-based networks even those using digital compression information services that require true broadband rates require fiber or coaxial cable technology, as a practical matter. Even low-end (i.e., POTS "plain old telephone service") services will reflect a lower per-subscriber cost on fiber, compared to present copper-based delivery systems. Specifically, fiber-based systems that provide residence telephony to groups of 4–8 subscribers with fiber to the curb (FTTC) are expected to achieve cost parity with copper in the near future. However, the cost to replace the existing copper plant in the U.S. with fiber optics is estimated a hundreds of billions of dollars. Thus, the length of time required to achieve this conversion could be decades.

One possible alternative to fiber or copper networks is a hybrid network which utilizes existing facilities and employs fiber optics, coaxial cable and copper wiring. Such a network would allow the delivery of many advanced services and yet be more cost efficient to allow earlier conversion to a broadband network with significant fiber optic capability included. At least one company has announced plans for such a hybrid network (DENVER POST, Apr. 24, 1993, Page C1).

Telephony, in addition to requiring two-way communication, has two other requirements not necessarily addressed by video networks: powering and privacy of communication. In video networks the power to operate the subscriber television set, for example, is provided by the subscriber. That is, the subscriber plugs his or her television and/or video cassette recorder into an electrical outlet which provides power in the subscriber location. In the event of a power outage, for whatever reason, the user is unable to view the television unless he or she has a backup source of power (i.e., battery or generator). Few people have such backup power. In telephony, on the other hand, subscribers expect phone service whether or not electricity is available. The following paragraphs discuss a history of power in the telephony network.

Telephones on the early manual networks had their own battery boxes which contained dry cells. These batteries were used to power the carbon granule microphones. In addition, a hand crank generator in the phone supplied the needed signaling to call others on the same line, or the operator. These two power sources within the telephone allowed a user to originate a call and to talk to other users. Neither of these sources were dependent upon household power, allowing calls to be placed even before rural electrification.

When automatic switching was introduced into the network, the battery box was replaced with a common battery located at the switch, including a common ringing voltage source. The central office switch also needed power to operate and make connections between users. Supplying power to each telephone allowed current flow and the timed interruption of that current (dial pulses) to signal the switch of the user's intentions. In addition, the busy state current could be used by the telephone to power the carbon microphone.

Because of the need to protect the switch and the telephone connections from service interruptions, the power plant at the central office was backed up with large wet cell batteries. These batteries in turn were often backed up with motor-generated sets. Several different voltages are used within the network, but the primary supply is –48 volt direct current (vdc) and ±105 volts at 20 Hz.

Over time as the telephone network grew in size and service penetration approached 100 percent, service availability (reliability) became one of the most important obligations of the network. For a time, the telephones in users' homes belonged to the network and were maintained by the network owner. In the past 20 years, the ownership of the telephone has changed again and carbon microphones aren't used anymore. However, the new electronic telephones with their silicon chips still rely on the network to supply power for call supervision and even for memory backup.

Service availability is a responsibility shared by the network and the user. The network is responsible for maintaining the switch and connecting trunks as well as testing and maintaining the individual lines to each user. The user also contributes to service availability by keeping the telephone on-hook when it is not needed, by maintaining premises wiring and terminal equipment in good repair, and by limiting the total quantity of equipment connected to one line.

Maintaining the batteries in the telephone's battery box was difficult. Thus, network power is preferable. First of all, the financial cost associated with placing the terminal power back in the terminal equipment would be huge. The supply and maintenance of the needed batteries would either be forgotten (like those in smoke detectors) or would be eliminated. Both of these results would limit the user's service availability. The second reason that power will likely remain in the network is due to the regulatory bodies who are concerned with "life-line" services. This relates to phone service being perceived as a necessarily as pointed out above. Basic telephone service is expected to be available to everyone at a reasonable cost 24 hours a day.

There are few exceptions. Some services are powered by the user today. As more services are introduced in the future, the user equipment associated with these new services may also be non-network powered. One good example is Integrated Services Digital Network (ISDN) services, whether Basic or Primary Rate Interfaces. With ISDN, the network powers its portion of the circuit and the user powers the terminal equipment. Most data services also fall into this category.

Power can only be provided over a fiber optic network with great difficulty and expense. As discussed above, power can and is easily provided over a copper-based network. There are video systems today which utilize cable phone systems in which telephony is provided over a video network system. However, such systems require power supplied by the subscriber, usually in the form of AC power and (in some cases) batteries at the subscriber premises. In addition, adaptive hardware in the form of converter boxes are needed to utilize the phone system.

Hybrid networks such as that shown in FIG. 1 solve the powering and privacy issues as follows. Power is provided by a separate power cable 20 laid along side the fiber optic and/or coaxial cable. A power source 32 is tapped in the central office 13 and cable 20 provides that power to the optical network unit 15. Thus, power for telephony services is provided from the network as in present networks. Privacy is assured because the remote digital terminal 18 prevents any one subscriber from monitoring any other subscriber.

While suited for its intended purpose, the network architecture of FIG. 1 is costly. If the cost of the network was reduced, then such an architecture would become more feasible.

SUMMARY OF THE INVENTION

The invention is a network for providing power for video and telephony services to a subscriber. The network incorporates fiber optic cable, coaxial cable, and twisted pair copper wiring. The network provides power for the telephony services from a network location through coaxial and copper wiring to the subscriber. Power can be provided over a coaxial cable relatively easily. Thus, in the hybrid network power for the telephony portion of the service is provided through the network from the point at which coaxial cable and copper are used.

BEST MODES FOR CARRYING OUT THE INVENTION

Figure 1:
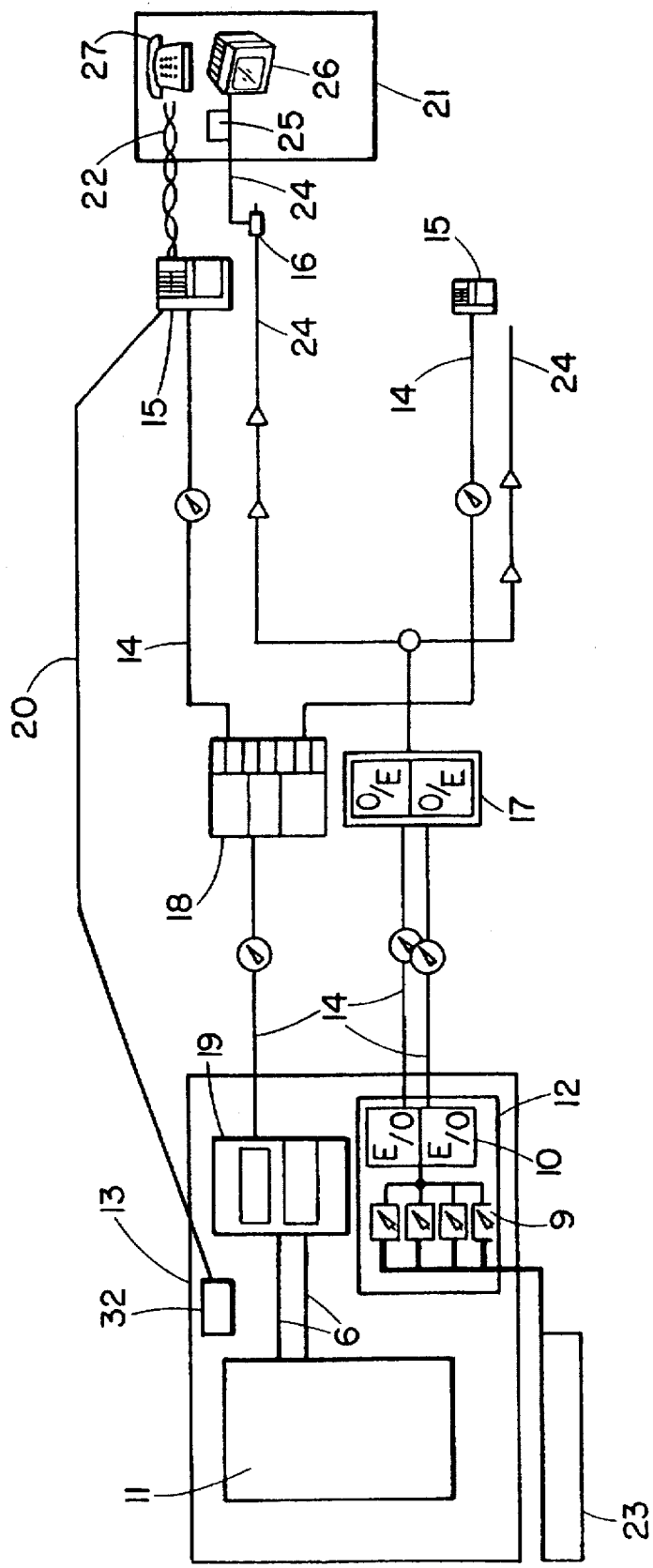
FIG. 1 illustrates a prior art broadband hybrid fiber/coaxial cable network architecture.

Like reference numerals will denote like structure throughout the description of the various figures. Referring to FIG. 1, a broadband hybrid fiber/coaxial cable network architecture is shown. A digital switch 11 and a video transmission device 12 including RF modulators 9 and electric/optical converters 10 are shown in a central office 13. Digital telephony signals are carried over DS1 lines 6 through SONET multiplexer 19 to a fiber optic cable 14. This architecture represents a fiber to the curb (FTTC) type of architecture with a video remote transport overlay. That is, fiber optic cables 14 carry digital telephony signals (SONET 0C3) from the central office through a remote digital terminal 18 to an optical network unit 15 (ONU). ONU 15 may include a video interdiction device 16 or interdiction device 16 could be separately located as shown in FIG. 1. The analog video signals (AM-FDM) from a number of video information providers 23 are carried through giver optic cable 14 to one or more remote nodes which may include an analog passband video receiver 17 which includes optical/electrical converters where the analog optic signals are converted to analog electrical signals on a coaxial cable 24.

A power supply cable 20 which may be a 22 gauge electrical cable supplies power directly from power source 32 in central office 13 to optical network unit 15. From optical network unit 15 telephony services may be provided to subscriber premises 21 over a conventional twisted cooper pair line 22 to a telephone 27. Typically an ONU serves up to eight subscriber locations. Video services from a number of video information providers 23, such as satellite systems or video storage/retrieval equipment, or other suppliers are provided to subscriber premises 21 through coaxial cable 24. A video set-top converter 25 may or may not be required to descramble these video signals to a television 26.

The network depicted in FIG. 1 avoids problems associated with the delivery of telephony and video signals to the home. That is, since the signals are carried on separate transport systems, each of the signals may be treated separately. For example, telephone 27 in subscriber premises 21 may be powered from central office 13 as is done n conventional telephony. Powering of the receiver 17 may be done from the video network. Powering of the set-top converter 25 and television 26 may be done from subscriber premises 21. In addition, privacy issues with respect to telephony services over copper wire 22 are maintained as in a conventional telephony network. As is known in the art, more than one ONU could be connected to terminal 18. Similarly, more than one interdiction tap 16 could be connected to receiver 17. The drawbacks with the network shown in FIG. 1 include complexity and cost. That is, fiber optic cable 14, power cable 20, and coaxial cable 24 must be laid from each central office 13 to each optical network unit 15 or subscriber premises 21. In addition, additional equipment such as remove digital terminals 18 are required to efficiently transport the optical signals.

Figure 2:
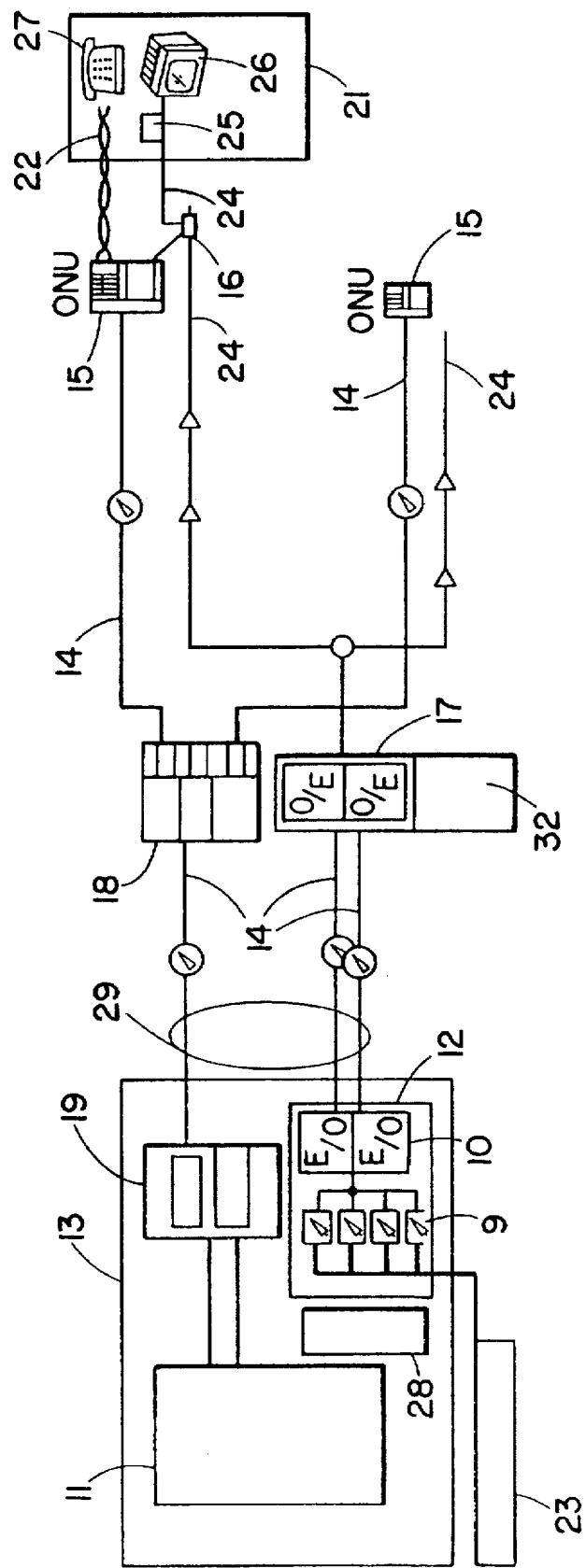
FIG. 2 illustrates a hybrid fiber/coaxial cable network architecture illustrating the invention.

Referring to FIG. 2, an alternate hybrid fiber coax network is illustrated. As with FIG. 1, central office 13 includes telephone switch 11 and video transmission equipment 12 from which a system manager 28 controls various ancillary functions of video services supplied from providers 23 as with the architecture in FIG. 1, telephony signals and video signals are carried from central office 13 on fiber optic cable 14 through the feeder portion of the outside plant 29. The telephony signals are passed through remote digital terminals 18 and supplied through give optic cable 14 to optical network unit 15. The video signals are transported to video receiver 17 where they are converted from optic to electrical signals on coaxial cable 24. The video signals are then supplied to interdiction device 16 at the location of the optical network unit 15. In this embodiment ONU 15 and interdiction device 16 are connected and preferably co-located. The major difference between FIG. 2 and FIG. 1 is that power may be supplied through coaxial cable 24 by a power supply 32 which may include an electrical connection to the electrical utility and backup batteries. Thus, power supply cable 20 in FIG. 1 is eliminated.

The elimination of power supply cable 20 represents a significant cost savings over the architecture of. Fog. 1. As with FIG. 1, the video signals through coaxials cable 24 are supplied to customer premises 21 through interdiction unit 16 contained in optical network unit 15. Power is now supplied to telephone 27 from power supply 32 through coaxial cable 2 and ONU 15. Coaxial cable 24 from interdiction device 16 to customer premises 21 supplies only video signals to television 26 and does not supply power. As with FIG. 1, a video set-top converter 25 may or may not be included in the system. FIG. 2 represents a substantial improvement over the network shown in FIG. 1 in that the elimination of power supply cable 20 result sin significant cost savings and simplifies the architecture.

Figure 3:
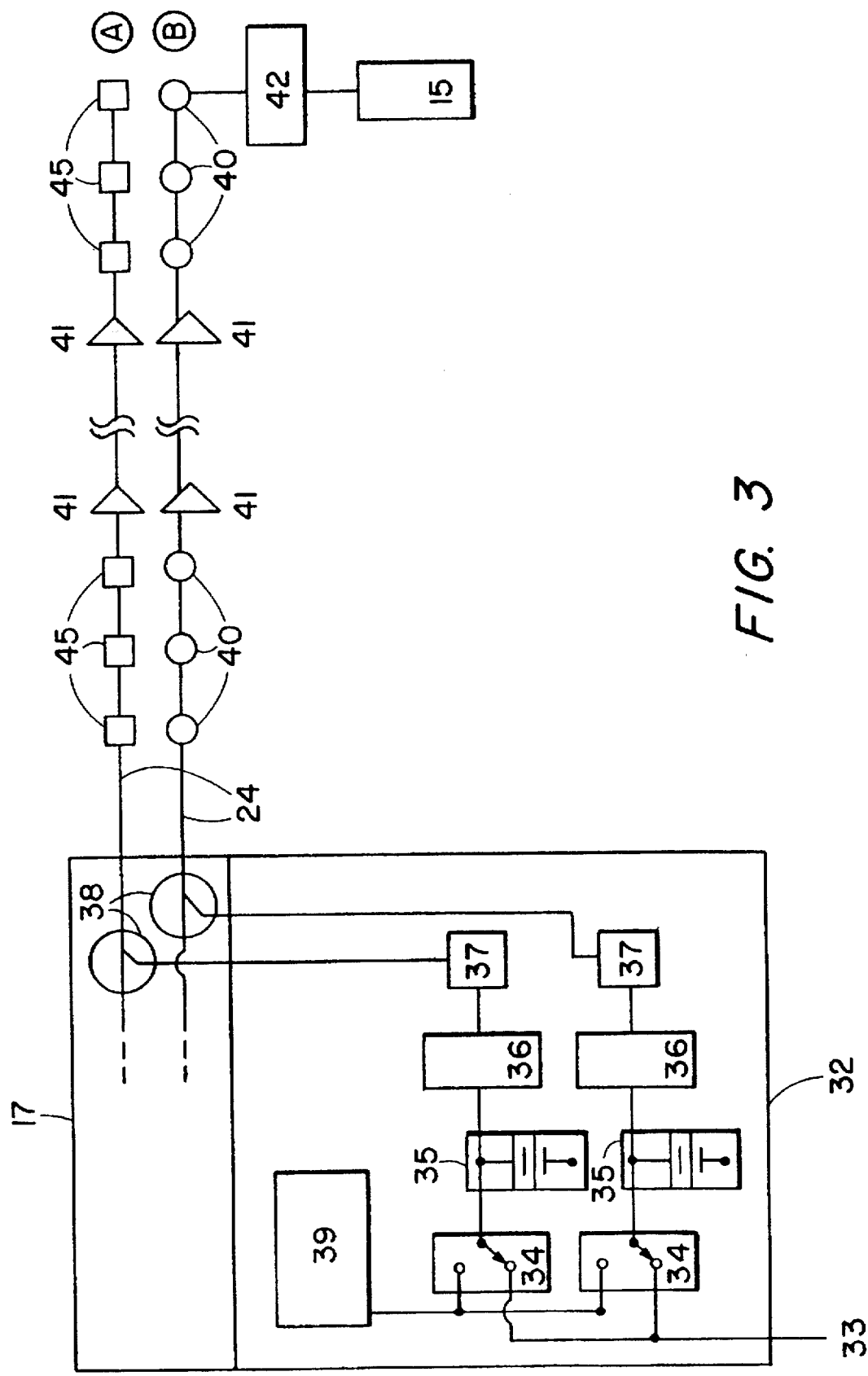
FIG. 3 is a schematic illustrating the powering system.

Referring to FIG. 3, at power supply 32, single-phase 240 VAC power from commercial mains is connected to input connection 33. The 240 VAC power connects to an automatic power transfer switch 34 that is normally set to connect rectifier/batteries 35 to the incoming commercial power. The output of rectifier/batteries 35 is connected to inverters 36 and ferroresonant transformers 37. Output of ferroresonant transformers 37 is 60 VAC quasi square-wave power that is connected to the center conductors of two separate coaxial cables 24 through power inserters 38 in optical node 7. Return path for 60 VAC quasi square-wave power is the outer conductor of the respective coaxial cables 24.

60 VAC power is provided to interdiction tap devises 45 and line amplifiers 41 along one coaxial cable 24. Each such device requires voltage in the range of 40 VAC to 60 VAC, and maximum current at input to the power inserter 38 for a single coaxial cable is 15 amperes.

60 VAC power is provided to eight-port tap units 40 and line amplifiers 41 along the second coaxial cable 24. Each eight-port tap 40 has one additional port that provides access to power only. Power is connected to power converter 42, where the 40–60 VAC form of power is converted to a variety of voltages and waveforms such as −48 VDC, 105 VAC and 20 Hertz, −130 VDC, and others may be necessary for the application. Power from power converter 42 is connected to optical network unit 15 or similar device requiring power for operation.

At power supply 32, commercial power may be interrupted from time to time for a variety of reasons. When 240 VAC commercial power no longer appears at input connection 33, rectifier/batteries 35 continue to provide power to inverters 36, ferroresonant transformers 37, and power inserters 38, from the stored charge in the batteries. Batteries are sized to provide one or more hours of normal operation of all equipment on coaxial cables 24. After present time or decay of battery power reserve to a present threshold, engine-alternator 39 is automatically started and automatic power transfer switch 34 is changes to connect rectifier/ batteries to engine-alternator instead of input connection 33. During this mode of operation, engine-alternator 39 provides power for the total coaxial cable system and restores the charge in the batteries 35. After commercial power reappears at input connection 3, automatic power transfer switch 34 is changes to connect rectifier/batteries 35 to commercial power and the engine-alternator 39 is turned off.

The normal power distribution for ONUs is a copper pair to each ONU. A copper pair is used per each ONU and is carried in the same trench as the fiber. The coax solution s very cost effective when compared to copper for powering a allows RF services to be carried on the same cable. It requires only one coaxial cable to power all broadband amplifiers and all ONUs on distribution leg. The coax cable is fed with broadband RF at the video node. Each node is approximately 300–400 houses.

Figure 4:
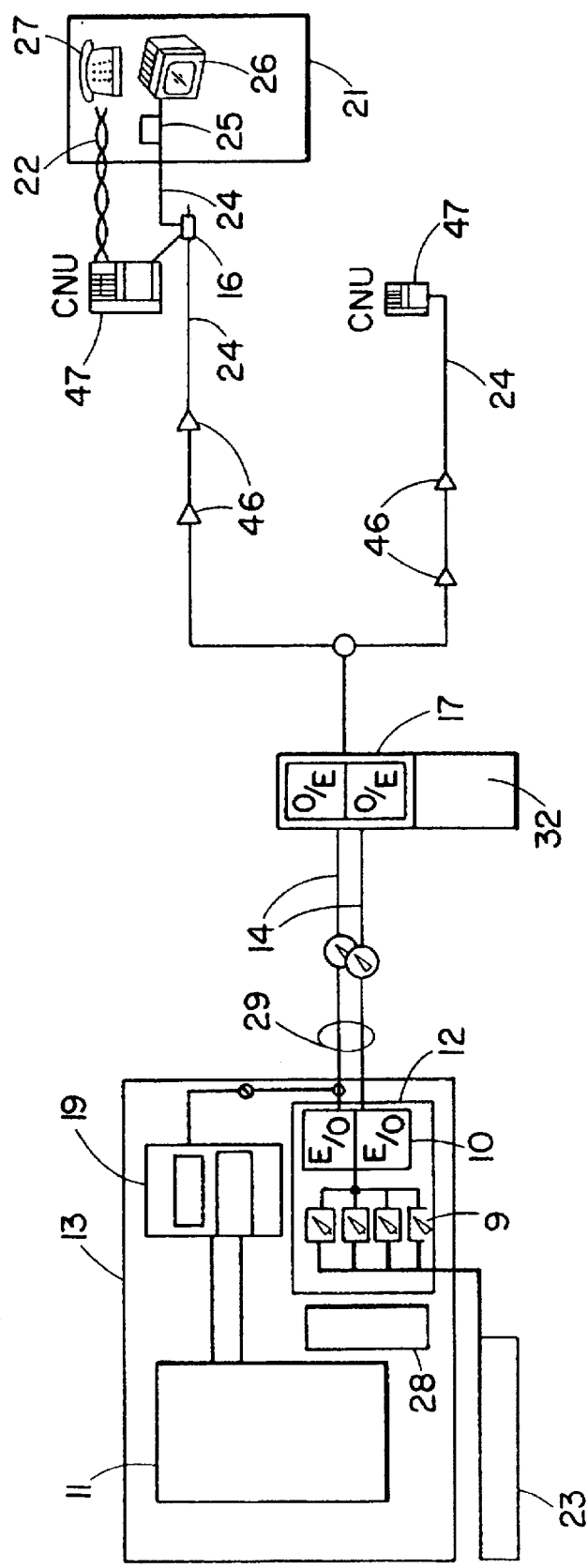
FIG. 4 illustrates an alternate embodiment of the hybrid fiber/coaxial cable network architecture shown in FIG. 2.

An alternative embodiment is shown in FIG. 4. In this embodiment a cable network unit (CNU) 47 takes the place of the optical network unit (ONU) 15 in FIG. 2. This embodiment utilizes modulated RF carriers that traverse analog fiber 14 and coaxial cable In this alternative, analog and digital signals for video and telephone along with power for all necessary equipment are simultaneously carried on coaxial cable 24. For example, power may be supplied to one of more line amplifiers 46, interdiction device 16 and CNU 47 over coaxial cable 24. CNU performs the same functions as an ONU but the interface to the network is coaxial cable 24 rather than fiber 14 (FIG. 2). Power to CNU 47 is supplied through coaxial cable 24 as in the embodiment shown in FIG. 2. In particular, CNU 47 receives both video and telephony signals as well as power through coaxial cable 24. Baseband telephony signals are then supplied to premises 21 over copper wire 22 and video signals are supplied to premises 21 over coaxial cable 24. The embodiment allows the elimination of much of the optical network. For example, remote digital terminal 18 and much of optical fiber 14 as shown in FIG. 2 are eliminated. Utilization of this embodiment allows telephony and video signals to be delivered to premises 21 while the power of customer premises equipment such as telephone set 27 is provided from the network as with traditional telephony services.

While the invention has been disclosed with respect to a preferred embodiment, changes and modifications may be made which are within the intended scope of the invention as defined by the appended claims.

What is claimed is:

1. A video and telephony network including a plurality of telephones operatively connected thereto at one or more subscriber premises comprising:

a fiberoptic transmission system;

a coaxial cable transmission system electromagnetically connected to said fiberoptic transmission system;

a telephone switching system electromagnetically connected to said fiberoptic transmission system;

a video provisioning system electromagnetically connected to said fiberoptic transmission system;

a video receiver electromagnetically connected to said coaxial cable transmission system;

an optical network unit electromagnetically connected to said coaxial cable transmission system and located external to said subscriber premises; and a power supply electromagnetically connected to said coaxial cable transmission system;

whereby power from said power supply is transmitted through said coaxial cable transmission system to said optical network unit to provide an electromagnetic form of signaling and supervision for a telephone service application for said telephones.

2. A hybrid distribution architecture for providing video and telephony signals to customer premises equipment, comprising:

a telephone switching system;

an optical network unit in electromagnetic communication with the customer premises equipment;

a fiber optic network in electromagnetic communication with the telephone switching system and the optical network unit for providing telephone signals to the customer premises equipment;

a power supply;

a video provisioning system; and a coaxial cable network in electromagnetic communication with the power supply and the video provisioning system for providing power to the optical network unit and video signals to the customer premises equipment.

3. A hybrid distribution architecture as in claim 2, wherein the optical network unit is operative to provide an electromagnetic form of signaling and supervision for a telephone service application to the customer premises equipment.

4. A hybrid distribution architecture as in claim 2, wherein the video provisioning system and the telephone switching system are co-located.

5. A hybrid distribution architecture as in claim 4, wherein the video provisioning system and the telephone switching system are co-located in a central telephone office.

6. A hybrid distribution architecture for providing video and telephony signals to customer premises equipment, comprising:

a telephone switching system;

an optical network unit in electromagnetic communication with the customer premises equipment and located external thereto;

a fiber optic network in electromagnetic communication with the telephone switching system and the optical network unit for providing telephone signals to the customer premises equipment;

a power supply;

a video provisioning system; and a coaxial cable network in electromagnetic communication with the power supply and the video provisioning system for providing power to the optical network unit and video signals to the customer premises equipment.

7. A hybrid distribution architecture as in claim 6, wherein the optical network unit is operative to provide an electromagnetic form of signaling and supervision for a telephone service application to the customer premises equipment.

8. A method for providing video and telephony services to customer premises equipment, comprising:

supplying telephony signals to a fiber optic network for receipt by the customer premises equipment;

supplying video signals to a coaxial cable network for receipt by the customer premises equipment;

providing power to the coaxial cable network; and converting the power to provide an electromagnetic form of signaling and supervision for a telephone service application to the customer premises equipment.

* * * * *